United States Patent [19]

Dimeff

[11] Patent Number: 4,492,122
[45] Date of Patent: Jan. 8, 1985

[54] CIRCUIT FOR LINEARIZATION OF TRANSDUCER

[75] Inventor: John Dimeff, San Jose, Calif.

[73] Assignee: Mark Telephone Products, Inc., Santa Clara, Calif.

[21] Appl. No.: 394,990

[22] Filed: Jul. 2, 1982

[51] Int. Cl.³ ........................ G01B 7/18; G01L 19/00
[52] U.S. Cl. ............................................................. 73/708
[58] Field of Search ................ 73/708, 717, 718, 719, 73/720, 721, 722, 723, 724, 725, 726, 727, 728, 753, 754, 861.02, 861.03, 765, 766; 324/DIG. 1

[56] References Cited

U.S. PATENT DOCUMENTS

| | | | |
|---|---|---|---|
| 3,568,044 | 3/1971 | Elazar | 73/765 |
| 3,847,017 | 11/1974 | Watts | 73/765 |
| 4,202,218 | 5/1980 | Romo | 73/708 |
| 4,362,060 | 12/1982 | Okayama et al. | 73/708 |

Primary Examiner—Donald O. Woodiel
Attorney, Agent, or Firm—Townsend and Townsend

[57] ABSTRACT

A circuit having a transducer which normally provides a non-linear output as a function of a stimulus to which the transducer is responsive. The circuit is provided with a feedback resistor from at least one of a pair of output terminals coupled to the transducer, and the feedback resistor is coupled to the power input of the transducer. Any change in the output voltage will cause a current change through the transducer, and this current change has a linearizing effect on the output voltage. The circuit is especially adapted for use with a Wheatstone bridge having a power amplifier coupled to the input thereof and a differential amplifier coupled to the output thereof. In such a case, a pair of feedback resistors couple the output terminals of the differential amplifier with the input terminals of the power amplifier.

19 Claims, 1 Drawing Figure

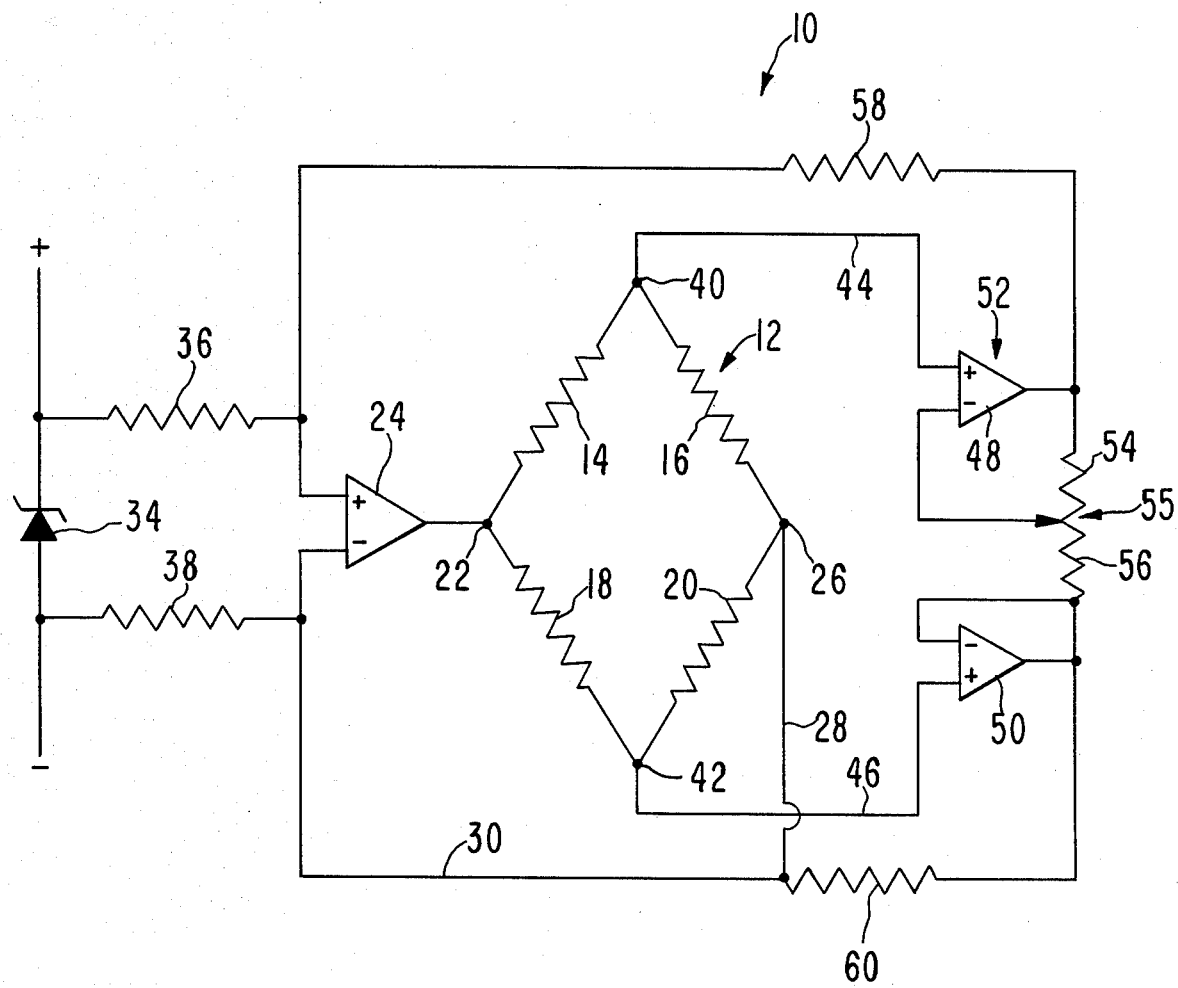

CIRCUIT FOR LINEARIZATION OF TRANSDUCER

BACKGROUND OF THE INVENTION

Typically, an ideal transducer has an output voltage that is directly proportional to the applied stimulus, such as pressure or temperature. Thus, if the transducer output shows a meter reading that is doubled, one can be assured that the stimulus has also doubled in magnitude. However, there are no really ideal transducers. Most of them include some non-linearities, the greatest non-linearity normally being the second order term of a power series that can be written to represent a transducer output characteristic, such as transducer output voltage. Such second order term is itself proportional to the stimulus, such as pressure, so that if a greater or lesser amount of stimulus is applied, the slope of the output signal from the transducer is increased or decreased in response to the change in that stimulus and the small incremental variations in the applied stimulus will produce different incremental readings on a meter which reads the output signal.

One of the problems in processing signals from such non-linear transducers is the need to adjust by electronic means the output indication so that such indication is corrected for the non-linearities inherent in the transducer itself. Since the non-linearities in the transducer can generally be described in any simple, continuous region by a power series, one can quite exactly correct for the nonlinearities by introducing a counter-balancing term for each of the higher order terms in the power series itself. For example, if there is a 1% positive term that is responsive to the square of the applied stimulus, i.e., pressure, one can correct for that term by introducing a 1% negative term in the amplification of the system that is also responsive to the square of an input voltage applied to the power amplifier of the system.

One means of obtaining the 1% negative term is to reduce the output signal of the transducer slightly under the control of and in proportion to the output signal itself. This can be accomplished in a Wheatstone bridge by applying a smaller voltage to power the bridge so that, as the output signal from the bridge is increased, the input voltage applied to the bridge from a power amplifier is reduced. The linearization or correction of the second order term mentioned above requires only that some portion of the applied or input voltage be responsive to the output signal so that then the total voltage on the transducer, such as a bridge will be proportional to some fixed level and to a component responsive to the applied stimulus.

SUMMARY OF THE INVENTION

The present invention provides a means for coupling the output of a transducer to the power amplifier at the input thereof in such a manner that a change in the output of the transducer will change the voltage at the power amplifier so as to alter the current flow through the transducer. If the sign and magnitude are properly adjusted, this altered current flow will have the effect of changing the output voltage so as to make it linear with an increase or decrease in the magnitude of the stimulus sensed by the transducer itself.

The invention is especially suitable for use with the output of a Wheatstone bridge which is coupled to a differential amplifier. The output terminals of the differential amplifier are coupled by respective feedback resistors back to the power amplifier inputs of the bridge itself and these resistors assure that current flow will increase or decrease through the bridge as a function of the output voltage increase at the output terminals of the differential amplifier. Thus, there will be a linearization of the output voltage of the bridge with an increase or decrease in the magnitude of the applied stimulus to the bridge.

The primary object of the present invention is to provide a circuit for linearizing the voltage output of a non-linear transducer wherein the output signal is returned to the input of the transducer in such a manner so as to cause an increase or decrease in the current flow through the transducer as a function of the change in the applied stimulus sensed by the transducer itself to thereby cause a corresponding linearizing change in the output voltage of the transducer.

Other objects of this invention will become apparent as the following specification progresses, reference being had to the accompanying FIGURE which shows the present invention as applied to a Wheatstone bridge.

In the FIGURE, circuit 10 includes a Wheatstone bridge 12 having four legs 14, 16, 18, and 20 which, for purposes of illustration, are shown as resistors, any one or all of which can be transducers responsive to a stimulus, such as pressure or temperature. A first input terminal 22 of the bridge is coupled to the output of a power amplifier 24. A second input terminal 26 of the bridge is coupled by leads 28 and 30 to the negative input of power amplifier 24. A Zener diode 34 is coupled by resistors 36 and 38 to the positive and negative input terminals, respectively, of power amplifier 24 to supply an input voltage thereto.

The output terminals 40 and 42 of the bridge are coupled by leads 44 and 46, respectively, to the positive input terminals of a pair of amplifiers 48 and 50 which are coupled in a manner to present a differential amplifier 52. A potentiometer 55 is coupled across the output terminals of the differential amplifier 52 so as to form a pair of resistors 54 and 56 in series. The potentiometer 55 can be adjusted so that the desired gain is derived from amplifier 48. Amplifier 50 provides a buffered reference for amplifier 48 at the voltage obtained from output terminals 42 to assure a common mode voltage rejection at the output terminals of the differential amplifier.

A first feedback resistor 58 is coupled at the signal output of the amplifier 48 and to the positive input terminal of power amplifier 24. A second resistor 60 is coupled between the signal output of the second amplifier 50 and the negative input terminal of power amplifier 24.

The voltage to the power amplifier 24 is applied by means of resistors 36, 38, 58, and 60. An increase in the difference voltage at the output terminals of the differential amplifier 52 will increase the difference voltage at the input terminals of power amplifier 24. This will require that the current flow through the bridge 12 and through the resistor 38 be altered. The voltage level at the negative terminal of power amplifier 24, in such a case, will have to change sufficiently to compensate for the increase in the difference in voltage levels at the positive and negative terminals of the power amplifier introduced from the outputs of amplifiers 50 and 52 via resistors 58 and 60, respectively. An increase in the current flow through bridge 12 causes the output voltage of the bridge to increase and, since the signal is proportional to the applied voltage of the bridge, the induced signal of the bridge will increase. This is the second order term for which we need to compensate for nonlinearity. This second order term is altered in sign by connecting feedback resistors 58 and 60 as shown in the FIGURE, or alternately so that resistor 58 is connected to the output of amplifier 50 while resistor 60 is connected to the output of amplifier 48.

To clarify the power amplifier operation, a voltage applied to the positive terminal of power amplifier 24 must be matched by the voltage applied to the negative terminal of the power amplifier. The voltage at the positive terminal of the power amplifier is derived, in part, from the Zener diode 34 and, in part, from any voltage connected through feedback resistor 58 from the differential amplifier output. The signal applied to the negative input terminal of the power amplifier is derived from the feedback resistor 60, but primarily from the output terminal 26 of the bridge which is powered by power amplifier 24 such that, if the bridge changes resistance a voltage across the bridge will have to change to provide the same current through that resistance between the negative input terminal of power amplifier 24 and ground. The voltage at the negative input terminal of power amplifier 24 is the product of the current through the bridge and the resistance of resistor 38. Thus, if one increases the voltage at the positive terminal of the power amplifier, more current must flow through the bridge and through resistor 38 to elevate the voltage at the negative terminal of the power amplifier to match that voltage applied to the positive terminal of the power amplifier.

In the circuit that is shown in the FIGURE, the voltage across the Zener diode is typically 1.2 volts. The current through the bridge is approximately 1.2 milliamperes and the value of the resistors 36 and 38 is typically 1,000 ohms each. To correct for non-linearities in the transducers of the bridge, the values of resistors 58 and 60 are typically 20,000 ohms each. While differential amplifier 52 provides common mode rejection, the output terminals of amplifier 52 do vary with the common mode voltage so that, in effect, if the bridge voltage rises from 10 volts to 12 volts, the voltage at one of the output terminals will increase from 5 to 6 volts and the other output of the differential amplifier will also increase from 5 volts to 6 volts. The positive output of the differential amplifier will change from 5 volts to 6 volts and the negative output of the differential amplifier will also change from 5 volts to 6 volts. These equal signals are equally divided by the resistance pairs 58-36 and 60-38 before being applied to the positive and negative input terminals of power amplifier 24. Since amplifier 24 responds only to differences in input voltages, it will reject the equal changes caused by the common mode changes described, and respond only to the difference in the output of amplifiers 50 and 52, that difference being proportional to the signal voltage derived from bridge 12.

What is claimed is:

1. A transducer circuit comprising: first means, including a differential amplifier having a pair of output terminals, defining a transducer responsive to a stimulus; second means, including a pair of input terminals, coupled with the transducer for providing a power input thereto; and third means, including a pair of feedback resistors, coupling the respective output terminals to respective input terminals of the second means to cause a change of the current flow through the transducer as a function of a change in the stimulus to thereby cause a linearization of the output signal at the output terminals of the transducer.

2. A circuit as set forth in claim 1, wherein said second means includes a power amplifier coupled to receive the pair of input terminals, a first one of the feedback resistors coupled between one of said output terminals of the differential amplifier and one of the input terminals of the power amplifier, and a second one of the feedback resistors coupled between the other input terminal of the differential amplifier and the other input terminal of the power amplifier.

3. A circuit as set forth in claim 2, wherein is included a power source, a first power resistor coupling one side of the power source with said one input of the power amplifier, and a second power resistor coupling the opposite side of the power source with the other input of the power amplifier.

4. A circuit as set forth in claim 1, wherein said differential amplifier includes a pair of amplifiers, means coupling the pair of amplifiers together to form said differential amplifier having said output terminals, and means coupled with said pair of amplifiers for equalizing the gains thereof to provide a common mode rejection therefor.

5. A circuit as set forth in claim 4, wherein said equalizing means comprises a potentiometer across said output terminal, one of the amplifiers being coupled to the shiftable terminal of the potentiometer. one input of the other amplifier being coupled to one side of the potentiometer.

6. A circuit as set forth in claim 1, wherein said defining means includes a differential amplifier.

7. A transducer circuit comprising: a bridge unit having at least one element responsive to a stimulus, said bridge unit having a pair of input terminals; a power amplifier coupled with the input terminals of the bridge for providing an input voltage thereto, said bridge unit having means defining a pair of output terminals therefor; and a pair of feedback resistors coupling the output terminals of the defining means to the input terminals of said power amplifier to cause a change of the current flow through the bridge unit as a function of a change in the stimulus to which said element is responsive to thereby cause a linearization of the output signal at the output terminals.

8. A circuit as set forth in claim 7, wherein is included a power source, a first resistor coupling one side of the power source with said one input of the power amplifier, and a second resistor coupling the opposite side of the power source with the input of the power amplifier.

9. A circuit as set forth in claim 7, wherein said means defining a pair of output terminals includes a pair of amplifiers, means coupling the amplifiers together to form a differential amplifier having said output terminals, and circuit means coupled with said pair of amplifiers to provide a common mode rejection therefor.

10. A circuit as set forth in claim 9, wherein said circuit means comprises a potentiometer across said output terminal, one of the amplifiers being coupled to the shiftable terminal of the potentiometer, one input of the other amplifier being coupled to one side of the potentiometer.

11. A transducer circuit comprising: first circuit means defining a transducer responsive to a stimulus, the first circuit means including a pair of amplifiers coupled together to form a differential amplifier having a pair of output terminals; second circuit means coupled with said pair of amplifiers for equalizing the gains thereof to provide a common mode rejection therefor, the second circuit means including a potentiometer across said output terminals, one of the amplifiers being coupled to the shiftable terminal of the potentiometer, one input of the other amplifier being coupled to one side of the potentiometer; third circuit means coupled with the transducer for providing a power input thereto; and fourth circuit means coupling at least one of the output terminals to the third circuit means to cause a change of the current flow through the transducer as a function of a change in the stimulus to thereby cause a linearization of the output signal at the output terminals of the transducer.

12. A circuit as set forth in claim 11, wherein the fourth circuit means includes a feedback resistor.

13. A circuit as set forth in claim 11, wherein the third circuit means includes a pair of input terminals, said fourth circuit means including a pair of feedback resistors coupled to respective output terminals and to respective input terminals of said third circuit means.

14. A circuit as set forth in claim 11, wherein said third circuit means includes a power amplifier having a pair of input terminals, said fourth circuit means including a first feedback resistor coupled between one of said output terminals of the differential amplifier to one of the input terminals of the power amplifier, and a second feedback resistor coupled between the other output terminal of the differential amplifier and the other input terminal of the power amplifier.

15. A transducer circuit comprising: means defining a transducer responsive to a stimulus; input power means, including a power amplifier having a pair of input terminals, coupled with the transducer for providing a power thereto, said transducer having means defining a pair of output terminals; circuit means coupling the output terminals to the input power means to cause a change of the current flow through the transducer as a function of a change in the stimulus to thereby cause a linearization of the output signal at the output terminals of the transducer, the circuit means including a first feedback resistor coupled between one of said output terminals and one of the input terminals and a second feedback resistor coupled between the other output terminal and the other input terminal.

16. A circuit as set forth in claim 15, wherein is included a power source, a first power resistor coupling one side of the power source with one input of the power amplifier, and a second power resistor coupling the opposite side of the power source with the other input of the power amplifier.

17. A circuit as set forth in claim 15, wherein said means defining a transducer includes a differential amplifier having said pair of output terminals.

18. A circuit as set forth in claim 15, wherein said means defining a transducer includes a pair of amplifiers, means coupling the amplifiers together to form a differential amplifier having said output terminals, and equalizing means coupled with said pair of amplifiers for equalizing the gains thereof to provide a common mode rejection therefor.

19. A circuit as set forth in claim 18, wherein said equalizing means comprises a potentiometer across said output terminals, one of the amplifiers being coupled to the shiftable terminal of the potentiometer, one input of the other amplifier being coupled to one side of the potentiometer.

* * * * *